Patented July 15, 1947

2,423,851

UNITED STATES PATENT OFFICE 2,423,851

PROCESS OF PRODUCING MENTHENETRIOL

John E. Reese, Wilmington, Del., assignor to Hercules Powder Company, Wilmington, Del., a corporation of Delaware No Drawing. Application May 15, 1945, Serial No. 593,959

8 Claims. (Cl. 260—631.5)

This invention relates to an improved process for the preparation of freely water-soluble terpene products and more particularly to an improved process of simultaneously oxidizing and hydrating terpinolene.

It is known that terpinolene may be oxidized with oxygen and water in neutral or acid medium to form a mixture of water-soluble polyhydroxy terpene derivatives and water-insoluble oxygenated terpene derivatives. The water-soluble product from this process may be resolved into three crystalline menthenetriols having melting points of 135–6° C., 124–5° C. and 121–2° C. and a water-soluble noncrystallizing portion. The noncrystallizing syrup is a mixture of trihydric alcohols, dihydric alcohols, dihydroxy ketones and dihydroxy esters. The water-insoluble oxidized oil is known to contain mono- and di-hydric alcohols, ketones and esters.

Now in accordance with this invention, it has been found that terpinolene may be oxidized to produce a water-soluble product which contains only one crystalline trihydric alcohol, namely, the trihydric alcohol having a melting point of 135–6° C., by contacting terpinolene in an alkaline medium having a pH of about 7.5 to about 13 with water and with a gas containing free oxygen, maintaining said contact until an appreciable portion of the terpinolene has reacted with water and with free oxygen, to form a mixture of hydroxylated, water-soluble terpene derivatives and separating the resulting reaction mixture at least into a fraction containing a water-soluble product and a fraction containing a water-insoluble product.

By carrying out the oxidation-hydration of terpinolene in an alkaline medium in accordance with this invention, the water-soluble oxygenated material contains only the higher melting crystalline trihydric alcohol instead of a mixture of three crystalline trihydric alcohols as is obtained when the oxidation is carried out in neutral or acid medium. Thus, greatly increased yields of the trihydric alcohol having a melting point of 135–6° C. are obtained by the present process. In addition, the water-soluble noncrystallizing syrup produced in accordance with this invention is a mixture of the above trihydric alcohol, a methenediol and a dihydroxy ketone of the menthene series and does not contain any dihydroxy esters as is the case when the reaction is carried out in neutral or acid medium. The water-insoluble oil also contains fewer components than when produced according to the prior method, containing a mixture of mono- and di-hydric alcohols and ketones, but no esters.

The following examples illustrate the method in accordance with this invention whereby terpinolene is subjected to an oxidation-hydration reaction in alkaline medium to produce the single crystalline trihydric alcohol having a melting point of 135–6° C. All parts given in the examples are parts by weight unless otherwise indicated.

Example I

A mixture of 300 parts of terpinolene (85–95% pure, refractive index 1.4888) and 300 parts of 2% aqueous sodium hydroxide was agitated at a temperature of 55° C. while a lively stream of air was passed through it. The progress of the reaction was followed by measuring, from time to time, the thickness of the oily layer and by determining its refractive index. When the volume of the oil phase stopped diminishing and its oxygen content, as determined by combustion, reached the value of 10% (a period of about two weeks), the treatment was stopped and the reaction products recovered.

The aqueous layer was separated from the oils and washed twice with benzene. After distilling off the benzene, the brown liquid residue was added to the oily layer. The aqueous phase was neutralized with dilute $H_2SO_4$ to a pH of 7.0 and then was distilled under reduced pressure to reduce the amount of water present. After about 100 parts of water had distilled over, the residue was allowed to cool and crystallize. The crystals were recovered by filtration and the mother liquor was concentrated for further crystallization. This process was repeated until no further crystals could be recovered. In this way, a total of 134 parts of light-brown crystals melting at 135–6° C. was obtained. On treating with a decolorizing agent, activated carbon, and recrystallization, colorless crystals were obtained. Combustion analysis, hydroxyl determination (Zerewitinoff), bromine number and quantitative hydrogenation proved that this crystalline product is a menthenetriol (empirical formula $C_{10}H_{18}(OH)_3$).

The yield of menthenetriol was equal to 40% of the total product or 55% of the water-soluble product.

The water from the mother liquor was completely evaporated and 110 parts of a dark-colored syrupy liquid was obtained. Analysis of this product showed it to have an empirical formula of $C_{10}H_{17.7}O_{3.2}$ and to contain approximately 10% methenediols, 35% dihydroxyketones of the menthene series and 55% of the menthenetriol.

The oil layer consisted of 96 parts and on analysis was found to have an empirical formula of $C_{10}H_{18}O$. It contained approximately 23% monohydric alcohols, 34% dihydric alcohols and 14% ketones.

*Example II*

A mixture of 1500 parts of terpinolene (90–95%) and a solution of 30 parts of sodium carbonate in 1470 parts of distilled water was placed in an apparatus based on the air-lift principle in which the terpinolene was circulated by the air used for the oxidation. The contact between the liquid phases was improved by a low speed mechanical agitator. The temperature of the reaction mixture was held at 55° C. and the alkali content of the aqueous layer was checked from time to time, restoring it when necessary to the original value by the addition of further amounts of sodium carbonate.

At the end of one week the reaction was stopped and the aqueous and oily layers separated. The aqueous layer was treated and the products recovered as described in Example I, whereby 481 parts of menthenetriol crystals having a melting point of 135–6° C. and 326 parts of the noncrystallizing syrupy liquid were obtained.

The 642 parts of oil were returned to the apparatus with 1500 parts of water and 20 parts of sodium carbonate. After three more weeks of oxidation in the same way as before, 232 parts of oxidized oils, 322 parts of the menthenetriol crystals and 53 parts of noncrystallizing syrup were recovered.

The total yield of menthenetriol having a melting point of 135–6° C. was 57% of the total product or 60% of the total water-soluble product.

The oxidized oils contained 12.3% hydroxyl (Zerewitinoff) and 2.8% carbonyl (corresponding to 15.2% terpene ketones) and had an average unsaturation of about one double bond.

*Example III*

A mixture of 300 parts of terpinolene (95% pure, refractive index 1.4888) and 300 parts of 2% aqueous sodium hydroxide was sparged with air at the rate of 0.2 cu. ft./hour/pound, the temperature being held at 35° C. After 7 days, 200 parts of the aqueous layer was drained off and replaced with 200 parts of 2% aqueous sodium hydroxide. The reaction was continued for a total of 26 days.

The oil and aqueous layers were separated and 85.2 parts of oil or 28.4% the total product were obtained. The aqueous layer was neutralized and water was distilled off under reduced pressure until the aqueous material had been reduced to one-half its volume. On cooling crystals separated which were recovered by filtration. A second crop of crystals was obtained by repeating the process. A third crop of crystals was obtained by extracting the mother liquor with acetone. The three crops of crystals melted sharply at 135–6° C. and totaled 146.2 parts which represented 48.7% of the total product or 58% of the water-soluble product.

The noncrystallizing syrup was recovered and amounted to 105.6 parts or 35.3% of the total product or 42% of the water-soluble product.

*Example IV*

Example III was repeated except that the temperature was held at 55° C. and an airflow of 0.15 cu.ft./hour/pound was used. The reaction was stopped at the end of 9 days and the products were recovered as described in that example.

The products obtained consisted of: 97 parts of oxidized oil representing 32.4% of the total product; 132.8 parts of menthenetriol crystals having a melting point of 135–6° C. representing 46.2% of the total product (57% of the water-soluble portion); and 110.6 parts of noncrystallizing syrup which equalled 34.8% of the total product (43% of the water-soluble portion).

Terpinolene or mixtures rich in terpinolene may be used to carry out the reaction in accordance with this invention. When a good yield of menthenetriol crystals is desired, a raw material containing at least 70% terpinolene should be used. A terpene hydrocarbon fraction having a boiling point range of about 187° C. to about 191° C., a specific gravity of about 0.860 to about 0.865

$$\left(\frac{15.6° \text{ C.}}{15.6° \text{ C.}}\right)$$

and a refractive index of about 1.4883 to about 1.4890, is believed to be terpinolene, although this identification is not positive, due to conflicting physical constants given for terpinolene in the literature. Hereinafter, when the term "terpinolene" is used, it will be understood that a terpene hydrocarbon cut having a boiling point in the range of about 180° C. to about 195° C., a specific gravity within the range of about 0.855 to about 0.873

$$\left(\frac{15.6° \text{ C.}}{15.6° \text{ C.}}\right)$$

and a refractive index between about 1.4750 and about 1.4900, is meant. This includes the pure terpinolene.

Various commercially available terpene "cuts" may be used, although it will be understood that the closer the boiling range of the "cut" is to 187° C. to 191° C., which represents terpinolene of fairly high purity, terpinolene of absolute purity being thought to boil at 188° C., the more efficient the reaction will be. A terpene fraction boiling in the range of about 180° C. to about 195° C. and having a specific gravity within the range of 0.863 to 0.873, secured in the refining of crude wood turpentine, is satisfactory for the purpose. Likewise, a terpene mixture secured as a by-product in the manufacture of camphor, boiling within the range of about 180° C. to about 190° C. and sold under the trade name of "Terpene B" may be used. By-product terpene obtained in the hydration of turpentine or in the preparation of terpene ethers may also be used. Likewise, substantially pure alpha-terpineol may be dehydrated with sodium acid sulfate or other dehydrating agent and the resultant produce fractionated to separate a cut with a boiling range of 187° C. to 191° C., which is particularly suitable for reaction in accordance with this invention.

The gas containing free oxygen, required in the process, may be substantially pure oxygen, such as that sold in steel cylinders under pressure or it may be a mixture of oxygen with inert gases, such as nitrogen. Air as such, or fortified by commercial oxygen, is a suitable form of oxygen supply. The reaction is accelerated by a high oxygen content of the gas used. By washing the oxygen-containing gas in aqueous alkali before passing it into the reaction mixture, the gas is humidified, which avoids the loss of water by evaporation from the aqueous phase, and also carbon dioxide, the presence of which lowers the alkalinity of the aqueous layer, is eliminated.

The reaction in accordance with this invention is carried out in alkaline medium. The alkalinity of the aqueous phase may vary from a pH of about 7.5 to about 13.0, preferably it is maintained within a range of pH of 9.5 to 11.5. Higher or lower pH ranges tend to give dark-colored products. The alkali used, to maintain the alkalinity of the reaction, may be any alkaline alkali metal compound, such as the hydroxide of an alkali or alkaline earth metal, or salts of strong alkalies with weak acids, such as the carbonate or bicarbonate of an alkali metal, trisodium phosphate, borax, etc. Sodium carbonate is particularly useful in this reaction.

The relative proportions of the aqueous medium and the terpinolene or terpene fraction containing terpinolene may vary over a wide range, provided that the water is present in excess of that required for reaction with the terpinolene present, i. e. in excess of one mole of water per mole of terpinolene. The ratio of the aqueous medium to the terpinolene may vary from 1:10 to 10:1, preferably within the range of from 1:3 to 3:1. The concentration of the alkali may vary within wide limits, i. e. from about 0.1% to about 20%. However, the lower concentrations of alkali are difficult to maintain because of the acids produced in said reactions, and a high alkali content tends to cause the formation of dark-colored products. It is, therefore, preferred to use an alkali concentration of about 1% to 5%. The aqueous phase of the reaction should be checked from time to time during the course of the reaction, by titration, and, when necessary, fresh alkali should be added to restore the original concentration.

The reaction may be carried out at any temperature in the range of from about 0° C. to about 90° C. The reaction may be carried out at room temperature, but the preferred temperature range is between 45° C. and 65° C.

If desired, the reaction may be carried out in the presence of a catalyst such as activated carbon.

It is desirable to keep the water phase and the water-immiscible phase of the reaction mixture in intimate contact with each other and with the oxygen-containing gas. It is particularly important to bring the oxygen into intimate contact with the terpinolene. This may be effected by means of efficient agitation and/or bubbling of the gas through the reaction mixture using nozzles of suitable construction, porous plates, tubes, etc., of various materials, such as fritted glass, Alundum, unglazed porcelain, etc. If desired, the reaction may be conducted under a pressure of oxygen in excess of that exerted by atmospheric oxygen. To obtain substantially complete reaction between the terpinolene and water, it is necessary to keep the two immiscible phases intimately mixed in the presence of an oxygen-containing gas for a period of from about five days to about four weeks.

The course of the reaction may be followed by taking samples at intervals from both the oily and aqueous layers. In the case of the oily layer, the specific gravity, refractive index, viscosity and oxygen content may be determined. All of these increase as the oxidation progresses. The most accurate is the determination of oxygen content which may be done by combustion analysis. The aqueous layer may be tested for alkalinity but the specific gravity is a more accurate indication of the progress of the reaction since it increases with the formation of the water-soluble products. As the concentration of the water-soluble product reaches the point of saturation, crystallization may occur either in the apparatus or after removal of the aqueous layer and cooling it to room temperature. As crystal formation may cause mechanical difficulties, it is advisable to remove a portion of the aqueous layer before crystallization sets in and replace it with fesh aqueous medium. This should be done if crystals separate when a test sample is cooled to about 10° C.

Upon formation of an appreciable quantity of the water-soluble material, or on completion of the reaction, the reaction mixture is allowed to stratify and the reaction products are recovered. The aqueous layer is washed with a solvent such as benzene, petroleum ether, hexane, etc., to remove dispersed oil particles and any menthenediols which may be held in the aqueous solution by the menthenetriols. The solvent wash or extract may then be added to the oily phase and the mixture may be washed with water to remove any of the menthenetriols being held in solution by the menthenediols. The oxidized oils are then recovered by distilling off the solvent, preferably at reduced pressure in order to avoid dehydration of the unsaturated alcohols.

The oxidized oils, prepared by the reaction in accordance with this invention, contain mono- and di-hydric alcohols and ketones. They do not contain any esters as in the case when the reaction is carried out in a neutral or acid medium. The oils prepared by the present process have the advantage that they may be distilled and fractionated at reduced pressure into their components. By such means, terpinolene, secondary and tertiary terpene alcohols, ketones and dihydric alcohols have been separated from them. The oils formed by the present processes are more effective as frothers for the flotation of heavy metal ores, especially sulfide lead ore, than are the oils produced by the prior art processes. These oils are also useful as wetting out agents, detergents, particularly in certain pulping operations, as plasticizers, and as solvents in printing ink, etc.

The water-soluble products are recovered from the aqueous layer by distilling off apart of the water at reduced pressure, preferably at a temperature not exceeding 60° C. When a sufficient amount of water has been removed, crystallization of the menthenetriol will take place on cooling the aqueous solution. The crystals are separated from the mother liquor by filtration or centrifuging and the mother liquor is subjected to further crystallization until further evaporation of water and subsequent cooling fails to bring about crystallization. The dark-colored residue, designated as the noncrystallizing portion of the water-solubles, does not consist entirely of noncrystalline compounds. Instead, it contains a large portion of the same menthenetriol that constitutes the crystals which are removed. That it does not crystallize is believed to be due to the interference of other substances present. Partial crystallization may be induced by the use of suitable organic solvents; for example, the addition of small amounts of acetone reduces the viscosity of the thick syrupy residue, so that better crystal growth may ensue.

With the successive stages of crystallization, the color of the crystals increases. By recrystallization combined with the treatment of the solutions with decolorizing agents, such as activated carbon, completely colorless crystals may be obtained.

The crystalline material obtained by the process of the present invention consists entirely of the menthenetriol having a melting point of 135-6° C. It can be distilled at 151-166° C. at a pressure of 2.5-6.0 millimeters of mercury. The crystalline menthenetriol comprises about 55% to 60% of the water-soluble product whereas by the older process the water-soluble product contained about 24% of this menthenetriol and about 10% each of the two menthenetriols having lower melting points.

The noncrystallizing water-soluble syrup produced in accordance with the present invention contains as its main constituent the menthenetriol having a melting point of 135-6° C. It also contains some menthenediols and some dihydroxy ketones of the menthene series. In contrast, the noncrystallizing portion obtained by the older process contains three isomeric menthenetriols and also dihydroxy esters as well as the menthenediols and dihydroxy ketones. The noncrystallizing portion prepared by the present process can be distilled at low pressures and even fractionated in suitably built low pressure fractionation columns without decomposition of the product as occurred in the case of the syrup obtained according to the older process.

The crystalline menthenetriol as well as the noncrystallizing syrup may be used as substitutes for glycerine and other polyhydric alcohols. They may also be used in the so-called soluble oils for textile applications, as thickeners in printing inks, and as intermediates for the production of other compounds.

It is believed that the reaction of terpinolene with oxygen and water proceeds according to the following mechanism. One molecule of oxygen is believed to be added to a methylene group on the terpinolene ring, whereby a hydroperoxide is formed. The hydroperoxide then rearranges to a hydroxyepoxide (intermolecular oxidation of one double bond) which reacts with water to form a trihydric alcohol.

What I claim and desire to protect by Letters Patent is:

1. The process of preparing a menthenetriol which comprises reacting terpinolene, in an alkaline medium having a pH of about 7.5 to about 13, with water and a gas containing free oxygen, the water and free oxygen being substantially the sole sources of oxygen in the product and separating the resulting reaction mixture into a fraction containing a water-soluble product and a fraction containing a water-insoluble product.

2. The process of preparing a menthenetriol which comprises reacting terpinolene, in an alkaline medium having a pH of about 7.5 to about 13, with water and a gas containing free oxygen at a temperature of about 0° C. to about 90° C., the water and free oxygen being substantially the sole sources of oxygen in the product and separating the resulting reaction mixture into a fraction containing a water-soluble product and a fraction containing a water-insoluble product.

3. The process of preparing a menthenetriol which comprises reacting terpinolene, in an alkaline medium having a pH of about 7.5 to about 13, with water and air at a temperature of about 0° C. to about 90° C., the water and air being substantially the sole sources of oxygen in the product and separating the resulting reaction mixture into a fraction containing a water-soluble product and a fraction containing a water-insoluble product.

4. The process of preparing a menthenetriol which comprises reacting a mixture of terpene compounds rich in terpinolene, in an alkaline medium having a pH of about 7.5 to about 13, with water and a gas containing free oxygen at a temperature of about 0° C. to about 90° C., the water and free oxygen being substantially the sole sources of oxygen in the product and separating the resulting reaction mixture into a fraction containing a water-soluble product and a fraction containing a water-insoluble product.

5. The process of preparing a menthenetriol which comprises reacting a mixture of unsaturated monocyclic terpenes boiling within the range of about 180° C. to about 190° C. and having a specific gravity within the range of 0.863 to 0.873, in an alkaline medium having a pH of about 7.5 to about 13, with water and a gas containing free oxygen at a temperature of about 0° C. to about 90° C., the water and free oxygen being substantially the sole sources of oxygen in the product and separating the resulting reaction mixture into a fraction containing a water-soluble product and a fraction containing a water-insoluble product.

6. The process of preparing a menthenetriol which comprises reacting terpinolene, in an alkaline medium having a pH of about 9.5 to about 11.5, with water and a gas containing free oxygen at a temperature of about 0° C. to about 90° C., the water and free oxygen being substantially the sole sources of oxygen in the product and separating the resulting reaction mixture into a fraction containing a water-soluble product and a fraction containing a water-insoluble product.

7. The process of preparing a menthenetriol which comprises reacting terpinolene with a dilute aqueous solution of sodium carbonate and with a gas containing free oxygen at a temperature of about 0° C. to about 90° C., the water and free oxygen being substantially the sole sources of oxygen in the product, and separating the resulting reaction mixture into a fraction containing a water-soluble product and a fraction containing a water-insoluble product.

8. The process of preparing a menthenetriol which comprises reacting terpinolene with a dilute aqueous solution of sodium hydroxide and with a gas containing free oxygen at a temperature of about 0° C. to about 90° C., the water and free oxygen being substantially the sole sources of oxygen in the product, and separating the resulting reaction mixture into a fraction containing a water-soluble product and a fraction containing a water-insoluble product.

JOHN E. REESE.

REFERENCES CITED

The following references are of record in the file of this patent:

Ward, "Jour. Am. Chem. Soc.," vol. 60, pp. 325-7 (1938).

Treibs, "Berichte," vol. 72 B, pp. 7-10 (1939).

Beilstein, "Handbuch der Organischen Chemie," vol. 6, pp. 1068-70. Supplement to vol. 6, pp. 534-5.

Plison, "Bull. Soc. Chim.," Series 5, vol. 3, pp. 1281-90, (1936).

Karrer, "Organic Chemistry," pp. 592, 644.

Taylor, "Richter's Organic Chemistry," vol. II (1939), p. 212.

Certificate of Correction

Patent No. 2,423,851.                                                                                           July 15, 1947.

JOHN E. REESE

It is hereby certified that errors appear in the printed specification of the above numbered patent requiring correction as follows: Column 1, line 50, for "methenediol" read *menthenediol*; column 4, line 59, for "produce" read *product*; column 5, line 30, for "said" read *side*; column 6, line 10, for "fesh" read *fresh*; line 48, for "apart" read *a part*; and that the said Letters Patent should be read with these corrections therein that the same may conform to the record of the case in the Patent Office.

Signed and sealed this 2nd day of September, A. D. 1947.

[SEAL]

LESLIE FRAZER,
*First Assistant Commissioner of Patents.*